(12) United States Patent
Ragot et al.

(10) Patent No.: US 9,489,961 B2
(45) Date of Patent: Nov. 8, 2016

(54) CONTROLLING A NOISE-SHAPING FEEDBACK LOOP IN A DIGITAL AUDIO SIGNAL ENCODER AVOIDING INSTABILITY RISK OF THE FEEDBACK

(75) Inventors: Stéphane Ragot, Lannion (FR); Balazs Kovesi, Lannion (FR); Alain Le Guyader, Lannion (FR)

(73) Assignee: FRANCE TELECOM, Paris (FR)

( * ) Notice: Subject to any disclaimer, the term of this patent is extended or adjusted under 35 U.S.C. 154(b) by 545 days.

(21) Appl. No.: 13/806,625

(22) PCT Filed: Jun. 17, 2011

(86) PCT No.: PCT/FR2011/051392
§ 371 (c)(1),
(2), (4) Date: Mar. 11, 2013

(87) PCT Pub. No.: WO2011/161362
PCT Pub. Date: Dec. 29, 2011

(65) Prior Publication Data
US 2013/0204630 A1    Aug. 8, 2013

(30) Foreign Application Priority Data
Jun. 24, 2010    (FR) ..................................... 10 55037

(51) Int. Cl.
*G10L 19/00*    (2013.01)
*G10L 21/00*    (2013.01)
(Continued)

(52) U.S. Cl.
CPC ............. *G10L 19/032* (2013.01); *G10L 19/04* (2013.01); *H04B 1/62* (2013.01)

(58) Field of Classification Search
USPC ....................................... 704/225, 228, 230
See application file for complete search history.

(56) References Cited

U.S. PATENT DOCUMENTS 4,389,726 A *  6/1983  Le Guyader ....... H03H 21/0014
                                              375/244
4,507,791 A *  3/1985  Gundry .................... H03G 5/16
                                              333/14

(Continued)

FOREIGN PATENT DOCUMENTS

WO    2008/151410 A1    12/2008
WO    WO 2008151410 A1 *  12/2008    ........... G10L 19/005

OTHER PUBLICATIONS

Hiwasaki Y et al: "G.711.1: A wideband extension to ITU-T G.711", 16th European Signal Processing Conference EUSIPCO 2008, Lausanne, Switzerland, Aug. 25-29, 2008, EURASIP, CH, Aug. 25, 2008, pp. 1-5, XP002562145.

(Continued)

*Primary Examiner* — Tammy Pham
*Assistant Examiner* — Walter Yehl
(74) *Attorney, Agent, or Firm* — David D. Brush; Westman, Champlin & Koehler, P.A.

(57) ABSTRACT

A method and apparatus are provided for controlling the shaping of encoding noise during the ADPCM encoding of a digital audio input signal. The noise-shaping is carried out through the use of feedback that comprises filtering noise. The method includes the following steps: obtaining a parameter for indicating a high spectral dynamic range of the signal, the parameter indicating a risk of instability of the feedback; detecting a risk of instability by comparing the indication parameter to at least one predetermined threshold; limiting the feedback in the event that a risk of instability is detected; and gradually reactivating the feedback over a predetermined number of frames subsequent to the current frame for which the feedback is limited. Also provided is an encoder with feedback, including a control module implementing the control method as described.

8 Claims, 10 Drawing Sheets

(51) Int. Cl.
*G10L 19/032* (2013.01)
*G10L 19/04* (2013.01)
*H04B 1/62* (2006.01)

(56) References Cited

U.S. PATENT DOCUMENTS 5,677,987 A * 10/1997 Seki .................. H04R 3/02
381/83
5,937,377 A * 8/1999 Hardiman ........... G10L 21/0208
704/225
2006/0083385 A1 * 4/2006 Allamanche .......... G10L 19/008
381/23
2011/0173004 A1 * 7/2011 Bessette ................ G10L 19/005
704/500
2011/0224995 A1 * 9/2011 Kovesi .................... G10L 19/24
704/500

OTHER PUBLICATIONS

International Search Report and English Translation of the Written Opinion of the International Searching Authority dated Oct. 27, 2011 for corresponding International Patent Application No. PCT/FR2011/051392, 7 pages.

* cited by examiner

CONTROLLING A NOISE-SHAPING FEEDBACK LOOP IN A DIGITAL AUDIO SIGNAL ENCODER AVOIDING INSTABILITY RISK OF THE FEEDBACK

CROSS-REFERENCE TO RELATED APPLICATIONS

This application is a Section 371 National Stage application of International Application No. PCT/FR2011/051392, filed Jun. 17, 2011, which is incorporated by reference in its entirety and published as WO 2011/161362 on Dec. 29, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of the coding of digital signals.

The coding according to the present disclosure is adapted especially for the transmission and/or the storage of digital signals such as audiofrequency signals (speech, music or other).

The present disclosure pertains more particularly to the control of a feedback loop in a waveform coding of ADPCM (for "Adaptive Differential Pulse Code Modulation") coding type and especially to embedded-codes ADPCM-type coding making it possible to deliver scalable binary train quantization indices.

BACKGROUND OF THE DISCLOSURE

The general principle of embedded-codes ADPCM coding/decoding specified by recommendations ITU-T G.722, ITU-T G.726 or ITU-T G.727 is as described with reference to FIGS. 1 and 2.

FIG. 1 thus represents an embedded-codes coder of ADPCM type (e.g.: G.722 low band, G.727) operating between B and B+K bits per sample; note that the case of nonscalable ADPCM coding (e.g.: G.726, G.722 high band) corresponds to K=0.

It comprises:
a prediction module 110 making it possible to give the prediction of the signal $x_P^B(n)$ on the basis of the previous samples of the quantized error signal $e_Q^B(n')=y_{I^B}^B(n')v(n')$ $n'=n-1, \ldots, n-N_Z$, where $v(n')$ is the quantization scale factor, and on the basis of the reconstructed signal $r^B(n')$ $n'=n-1, \ldots, n-N_P$ where n is the current instant.
a subtraction module 120 which deducts the prediction $x_P^B(n)$ of the input signal $x(n)$ from the latter to obtain a prediction error signal denoted $e(n)$.
a quantization module 130 $Q^{B+K}$ for the error signal which receives as input the error signal $e(n)$ to give quantization indices $I^{B+K}(n)$ consisting of B+K bits. The quantization module $Q^{B+K}$ is of embedded-codes type, that is to say it comprises a core quantizer with B bits and quantizers with B+k k=1, ..., K bits which are embedded in the core quantizer.

In the case of the ITU-T G.722 standard (coding of the low band), the decision levels and the reconstruction levels for the quantizers $Q^B$, $Q^{B+1}$, $Q^{B+2}$ for B=4 are given by tables IV and VI of the overview article describing the G.722 standard by X. Maitre. "7 kHz audio coding within 64 kbit/s". IEEE Journal on Selected Areas in Communication, Vol. 6-2, February 1988.

The quantization index $I^{B+K}(n)$ of B+K bits at the output of the quantization module $Q^{B+K}$ is transmitted via the transmission channel 140 to the decoder as described with reference to FIG. 2.

The coder also comprises:
a module 150 for deleting the K low-order bits of the index $I^{B+K}(n)$ to give a low bitrate index $I^B(n)$;
an inverse quantization module 121 $(Q^B)^{-1}$ to give as output a quantized error signal $e_Q^B(n)=y_{I^B}^B(n) v(n)$ on B bits;
a module 170 $Q_{Adapt}$ for adaptation of the quantizers and inverse quantizers to give a level control parameter $v(n)$ also called a scale factor, for the following instant;
an addition module 180 for adding the prediction $x_P^B(n)$ to the quantized error signal to give the low-bitrate reconstructed signal $r^B(n)$;
a module 190 $P_{Adapt}$ for adaptation of the prediction module on the basis of the quantized error signal on B bits $e_Q^B(n)$ and of the signal $e_Q^B(n)$ filtered by $1+P_z(z)$.

It may be noted that in FIG. 1 the hatched part referenced 155 represents the low-bitrate local decoder which contains the predictors 165 and 175 and the inverse quantizer 121. This local decoder thus makes it possible to adapt the inverse quantizer at 170 on the basis of the low bitrate index $I^B(n)$ and to adapt the predictors 165 and 175 on the basis of the low bitrate data reconstructed.

This part is also found identically in the embedded-codes ADPCM decoder as described with reference to FIG. 2.

In the absence of frame losses, the embedded-codes ADPCM decoder of FIG. 2 receives as input the indices $I^{B+k}$, where 0≤k≤K, arising from the transmission channel 140, version of $I^{B+k}$ possibly disturbed by binary errors. The decoder carries out an inverse quantization with the inverse quantization module 210 $(Q^B)^{-1}$ of bitrate B bits per sample to obtain the signal $e'_Q^B(n)=y_{I^B}^B(n) v'(n)$. The symbol "'" indicates a value decoded on the basis of the values received, and which may possibly differ from the value used by the coder on account of transmission errors. The output signal $r'^B(n)$ for B bits will be equal to the sum of the prediction $x'_P^B(n)$ of the signal and of the output $e'_Q^B(n)$ of the B-bits inverse quantizer. This part 255 of the decoder is identical to the low-bitrate local decoder 155 of FIG. 1.

By employing the bitrate indicator mode and the selector 220, the decoder can improve the signal reconstructed.

Indeed if mode indicates that B+1 bits have been transmitted, the output will be equal to the sum of the prediction $x'_P^B(n)$ and of the output of the inverse quantizer 230 with B+1 bits $y'_{I^{B+1}}^{B+1}(n)v'(n)$.

If mode indicates that B+2 bits have been transmitted then the output will be equal to the sum of the prediction $x'_P^B(n)$ and of the output of the inverse quantizer 240 with B+2 bits $y'_{I^{B+2}}^{B+2}(n)v'(n)$.

The embedded-codes ADPCM coding of the ITU-T standard G.722 (hereinafter named G.722) carries out a coding of the signals in broad band which are defined with a minimum bandwidth of [50-7000 Hz] and sampled at 16 kHz. The G.722 coding is an ADPCM coding of each of the two signal sub-bands [0-4000 Hz] and [4000-8000 Hz]

obtained by decomposing the signal with quadrature mirror filters. The low band is coded by an embedded-codes ADPCM coding on 6, 5 and 4 bits while the high band is coded by an ADPCM coder of 2 bits per sample. The total bitrate will be 64, 56 or 48 bit/s depending on the number of bits used for decoding the low band.

This coding was firstly developed for use in ISDN (Integrated Services Digital Network). It has been recently deployed in telephone applications of improved quality over IP networks.

For a quantizer with a large number of levels, the spectrum of the quantization noise will be relatively flat. However, in the frequency zones where the signal has low energy, the noise may have a greater level than the signal and is therefore no longer necessarily masked. It may then become audible in these regions.

Shaping of the coding noise is therefore necessary. In a coder like G.722, shaping of the coding noise adapted to embedded-codes coding is moreover desirable.

Generally, the aim of coding noise shaping is to obtain quantization noise whose spectral envelope follows the short-term masking threshold; this principle is often simplified so that the spectrum of the noise approximately follows the spectrum of the signal, ensuring a homogeneous signal-to-noise ratio so that the noise remains inaudible even in the lower energy zones of the signal.

A noise shaping technique for a coding of PCM type (for "Pulse Code Modulation") with embedded codes is described in ITU-T recommendation G.711.1 "Wideband embedded extension for G.711 pulse code modulation" or "G.711.1: A wideband extension to ITU-T G.711". Y. Hiwasaki, S. Sasaki, H. Ohmuro, T. Mori, J. Seong, M. S. Lee, B. Kövesi, S. Ragot, J.-L. Garcia, C. Marro, L. M., J. Xu, V. Malenovsky, J. Lapierre, R. Lefebvre. EUSIPCO, Lausanne, 2008.

This recommendation describes a coding with shaping of the coding noise by noise feedback such as illustrated in FIG. 3. A perceptual filter F(z) for shaping the coding noise (block 305) is calculated (block 303) on the basis of the decoded signals s'$_{L0}$(n) with a core bitrate of 64 kbit/s (L0 for Layer 0), arising from an inverse core quantizer (block 301). A core bitrate local decoder (block 301) therefore makes it possible to calculate the noise shaping filter F(z). Thus, at the decoder, it is also possible to calculate this same noise shaping filter on the basis of the core bitrate decoded signals.

A quantizer delivering core bits (block 308) and a quantizer delivering improvement bits (block 309) is used at the G.711.1 coder.

The G.711.1 decoder receiving the core binary stream (L0) and the improvement bits (L1), calculates the filter F(z) for shaping the coding noise in the same manner as at the coder on the basis of the core bitrate (64 kbit/s) decoded signal and applies this filter to the output signal of the inverse quantizer for the improvement bits, the shaped high-bitrate signal being obtained by adding the filtered signal to the decoded core signal.

Noise shaping thus improves the perceptual quality of the core bitrate signal. It offers limited improvement in quality for the improvement bits. Indeed, the coding noise shaping is not performed for the coding of the improvement bits, the input of the quantizer being the same for the core quantization as for the improved quantization.

The decoder must then delete a resulting spurious component through adapted filtering, when the improvement bits are decoded in addition to the core bits.

Noise shaping by noise feedback as implemented in recommendation G.711.1 is generalizable to PCM coders other than G.711 and to coding of ADPCM type.

An exemplary known noise feedback structure in PCM/ADPCM coding is presented in FIG. 4.

Hereinafter the following notation will be used:
s(n): input signal to be coded
s'(n): input signal of the coder (modified signal to be coded)
š(n): decoded signal provided by the local decoder
q(n)=s'(n)−š(n): quantization noise of the coder FIG. 4 illustrates an exemplary implementation of the shaping of the PCM/ADPCM coding noise. This coder comprises a PCM/ADPCM coding block 502 and a local decoder 503. The coding noise q$_G$(n)=s(n)−š(n) is filtered (block 504) and reinjected (block 505) onto the signal s(n). The prediction coefficients are estimated (block 500) on the basis of the signal s(n) whereas in G.711.1 (FIG. 3) they are estimated on the basis of the past decoded signal at the core bitrate. In a known manner, the filter A(z/γ) is typically obtained (block 500) on the basis of a linear prediction filter A(z) modeling the short-term correlations of the signal s(n), by attenuating the coefficients of the linear prediction filter A(z). The coding noise will be shaped by the filter $$H(z) = P_1(z) = \frac{1}{A(z/\gamma)}$$

with γ=0.92 as a typical value.

Indeed, for the scheme of FIG. 4, starting from S'(z)=Š(z)+Q(z), with q(n)=s'(n)−š(n) the PCM/ADPCM quantization noise, it may be shown that in the z-transform domain:

$$S(z) - \tilde{S}(z) = \frac{Q(z)}{A(z/\gamma)}$$

Stated otherwise the "global" coding noise q$_G$(n)=s(n)−š(n) corresponds to the PCM/ADPCM quantization noise q(n) filtered (shaped) by $$\frac{1}{A(z/\gamma)}.$$

Noise feedback applied to the ADPCM coding is an effective technique for improving the quality of PCM/ADPCM coders, by masking the coding noise, particularly for "natural" audio signals such as speech or music. The scheme of FIG. 4 makes it possible to shape the coding noise according to a masking filter $$\frac{1}{A(z/\gamma)}$$

so as to obtain a more homogeneous signal-to-noise ratio according to the frequencies.

However, for certain less "natural" signals than speech or music, noise feedback can, as is sometimes the case with looped systems, become unstable and lead to degradation or saturation of the decoded signal. Here, saturation has to be taken in the sense that the amplitude of the decoded signal exceeds the maximum values representable at finite precision (example: 16-bit signed integers) and thus leads to clipping of the signal.

Examples of problematic signals in respect of noise feedback are signals exhibiting fast transitions between stationary sequences of large spectral dynamic range, such as for example a series of pure sinusoids of different frequencies separated by short segments of silence.

In particular, "tonal" signals (pure sinusoids) are considered to be signals at risk that may give rise to a problem of instability or of saturation in coding schemes with noise feedback.

For this type of signal, the estimated masking (or shaping) filter $$\frac{1}{A(z/\gamma)}$$

varies rapidly in the transitions between sinusoids and in the attacks, the quantization noise which is reinjected is often very high.

The problem of stability and of saturation which is observed with noise feedback is particularly critical in ADPCM coding. Indeed, the ADPCM coding such as implemented in G.722 relies on a progressive adaptation of the coding parameters (quantization interval, prediction coefficients). This adaptation is done sample by sample according to a principle similar to the LMS (for "Least Mean Square") algorithm in adaptive filtering, thereby implying that the adaptation does not immediately follow the nonstationary characteristics of the signal to be coded. It is known that for certain signals the adaptation in the ADPCM coding alone (without noise feedback) may drop out ("mistracking"), in the sense that the adaptation diverges before re-converging after a certain time.

For problematic signals, the noise feedback may disturb the adaptation of the ADPCM coding, since—returning to FIG. 4—the signal to be coded s(n) is modified by the reinjected noise d(n) to form the signal s'(n).

When the reinjected noise d(n) is of similar level to the level of the signal s(n)—this often being the case in the fast transitions between stationary sequences of large spectral dynamic range —, the signal s'(n) at the input of the ADPCM coder may become very "unstable" depending on whether the signals s(n) and d(n) are in phase or out-of-phase. If moreover the ADPCM coding has an adaptation which drops out ("mistracking"), the noise feedback will amplify the duration and the magnitude of the dropout.

To show the origin of this phenomenon it is possible to calculate the Perceptual Signal-to-Noise Ratio $RSB_P$ (perceptual since it includes the effect of the noise feedback aimed at masking the coding noise):

$$RSB_P = \frac{\sum_{n=0}^{N-1} s^2(n)}{\sum_{n=0}^{N-1} [s(n) - \tilde{s}(n)]^2}$$

It may be shown that:

$$RSB_P = G_{MICDA}\left[\frac{RSB_Q - 1}{E_D} + 1\right]$$

where $G_{MICDA}$ is the prediction gain of the ADPCM coder, $RSB_Q$ the Signal-to-Noise Ratio of the ADPCM quantizer (around 24 dB for a 5-bit Laplace quantizer) and $E_D$ the energy of the impulse response $f_D(n)$ of the masking filter.

According to this formula, it is seen that the lower the gain $G_{ADPCM}$ and/or the higher the energy $E_D$, the lower is $RSB_P$. These two conditions (low $G_{ADPCM}$ and high $E_D$) both hold in situations of transitions between two sequences of pure sinusoids since the gain $G_{ADPCM}$ becomes very low (the ADPCM coding adapted to the first pure sinusoid takes a certain time before readapting to the second pure sinusoid) and $E_D$ is high since the sinusoids give very resonant reinjection filters. In this case the ADPCM coder will be unstable or close to instability.

Such instability and saturation phenomena are not acceptable since they can generate audible artifacts (e.g.: amplitude spikes localized in time), or indeed "acoustic shocks" in the case of complete saturation of the temporal level of the signal.

There therefore exists a need to forestall and control instability and saturation phenomena in coding structures with feedback, in particular for problematic signals such as series of pure sinusoids at various frequencies.

SUMMARY

An exemplary embodiment of the present disclosure relates to a method for controlling shaping of coding noise during the ADPCM-type coding of a digital audio input signal, the noise shaping being performed by the implementation of a feedback comprising a filtering of the noise. The method is such that it comprises the following steps:

obtaining of a parameter for indicating large spectral dynamic range of the signal, indicating a risk of instability of the feedback;

detection of a risk of instability by comparing the indicating parameter with at least one predetermined threshold;

limitation of the feedback in the case of detection of risk of instability;

progressive reactivation of the feedback over a predetermined number of frames following the current frame for which the feedback has been limited.

Thus, the method makes it possible to undertake fast and effective detection of potentially problematic signals running the risk of giving rise to phenomena of instability in the feedback. This phenomenon is thus avoided since limitation of the feedback is performed upon the appearance of these at-risk signals. This limitation can even consist of complete deactivation of this feedback.

The method therefore has a preventive action on the appearance of troublesome phenomena. The reactivation of the feedback loop is thereafter undertaken in a progressive manner so as not to give rise to overly abrupt variations of the coded signals.

In a particular embodiment, the parameter for indicating large spectral dynamic range of the signal is the second reflection coefficient arising from a linear prediction analysis of the input signal or else the second reflection coefficient arising from a linear prediction analysis of the decoded signal.

Thus, this parameter is very representative of the at-risk signals and therefore indicates the risk of instability of the feedback. This parameter is obtained during a linear prediction analysis performed to calculate especially the noise shaping filter. It is therefore advantageous to reuse it here to control the feedback.

In another embodiment, the parameter for indicating large spectral dynamic range of the signal is a signal-to-noise ratio between the input signal and the noise.

This parameter makes it possible to measure the risk of instability of the feedback for any type of at-risk signals, not only those exhibiting sinusoids.

In a possible embodiment, the limitation of the feedback is performed by setting to zero a weighting coefficient to be applied to the noise filtering parameters.

This amounts to canceling the action of the noise shaping filter and therefore to deactivating the feedback, in a simple manner.

In a variant embodiment, the limitation of the feedback is performed by applying a gain of zero value at the output of the noise filtering.

Thus, the filter remains invariant but its action is canceled at the output by the application of this gain. This makes it possible to deactivate the feedback without modifying the calculation of the filter.

In a simple manner, the progressive reactivation of the feedback is performed by applying a weighting coefficient to the filtering parameters, the weighting coefficient being defined by incrementation over the predetermined number of frames, in the case where the deactivation of the feedback loop is performed by setting to zero a weighting coefficient.

In the case where the deactivation of the feedback loop is performed by applying a gain of zero value at the output of the noise filtering, the progressive reactivation of the feedback is performed by applying an increasing gain value at the output of the noise filtering over the predetermined number of frames.

The method applies advantageously in the case of coders of hierarchical type and may be implemented at one and the same time during the core coding and during the improvement coding of a hierarchical coding.

Thus, not only are the problems of instability avoided during the core coding but also during the improvement coding, without however increasing in proportion the complexity of the coding.

An embodiment of present invention also pertains to a digital audio signal ADPCM-type coder comprising a feedback for shaping a coding noise containing a noise filtering module. The coder is such that it comprises a noise shaping control module including:

means for obtaining a parameter for indicating large spectral dynamic range of the signal, indicating a risk of instability of the feedback;

means for detecting a risk of instability by comparing the indicating parameter with at least one predetermined threshold;

means for limiting the feedback in the case of detection of risk of instability;

means of progressive reactivation of the feedback over a predetermined number of frames following the current frame for which the feedback has been limited.

It also pertains to a computer program comprising code instructions for the implementation of the steps of the control method according to an embodiment of the invention, when these instructions are executed by a processor.

An embodiment of the invention finally pertains to a storage means readable by a processor storing a computer program such as described.

BRIEF DESCRIPTION OF THE DRAWINGS

Other characteristics and advantages will be more clearly apparent on reading the following description, given solely by way of nonlimiting example and with reference to the appended drawings in which.

DETAILED DESCRIPTION OF ILLUSTRATIVE EMBODIMENTS

Figure 5:
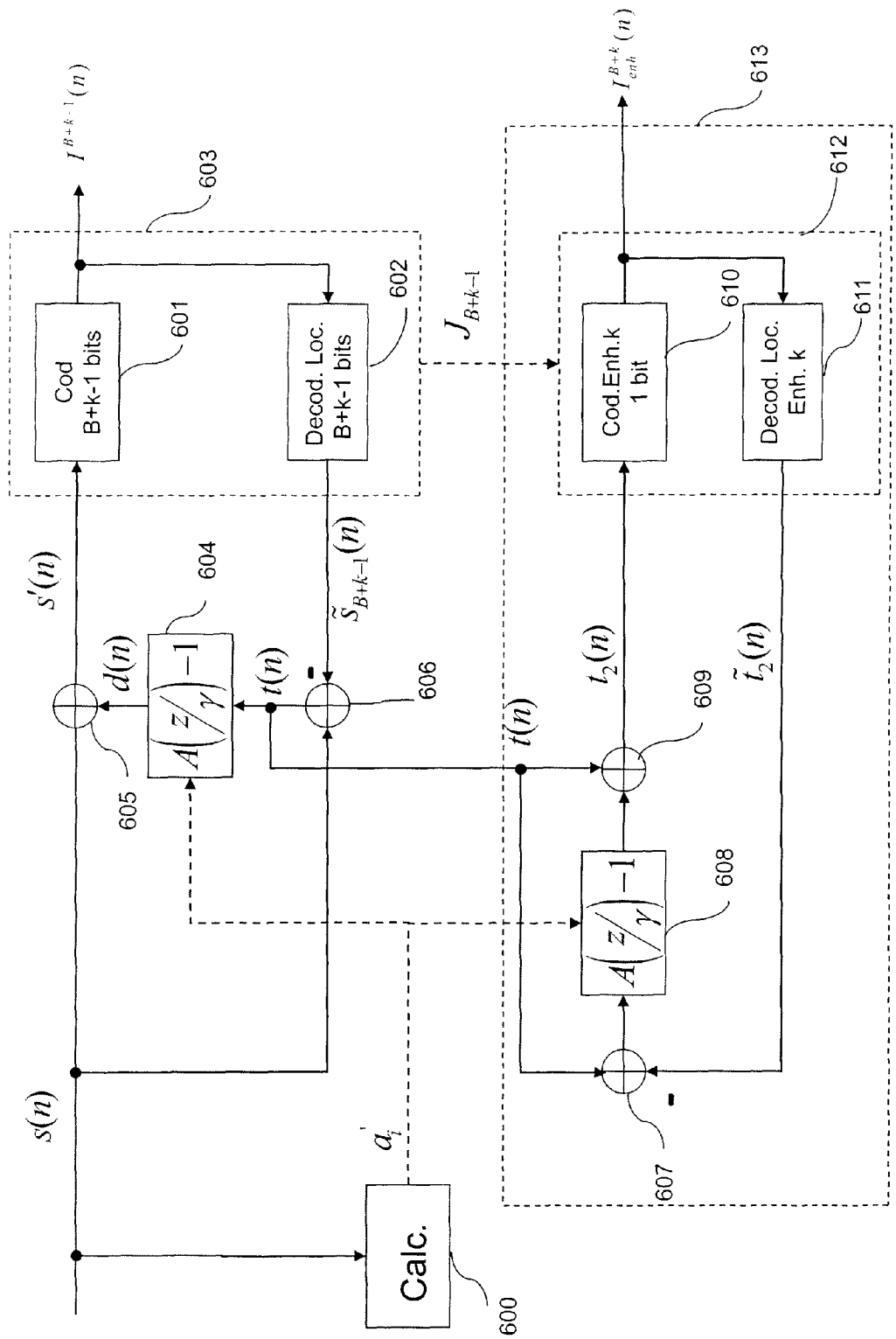
FIG. 5 illustrates an embodiment of a coder of PCM/ADPCM type with an improvement layer comprising a noise shaping control module according to an embodiment of the invention.

With reference to FIG. 5, an embedded-codes coder integrating an embodiment of the invention is now described.

This coder operates on signals sampled at 8 kHz with frames of 5 ms. It comprises a coding noise shaping which is implemented by noise feedback (steps 606, 604, 605). Noise feedback is here intended to mean the steps of obtaining a noise (606), of filtering the noise (604) and of modifying a signal (605). Note that here the signal modified by the feedback is the input signal s(n) but in an equivalent manner in the case of an ADPCM coding another signal may be modified before the coding step (601), for example the signal modified by the feedback may be the difference between the input signal s(n) and the signal predicted by the ADPCM coding, before applying the ADPCM scalar quantization.

In the example described here, the coding is performed with improvement stages affording one bit per additional sample. This choice is adopted here so as to simplify the presentation of the coder. It is however clear that an embodiment of the invention described hereinafter applies to the more general case where the improvement stages afford more than one bit per sample.

Moreover, the term "core coder" is used in the broad sense in this document. Thus, an existing multi-bitrate coder such as for example ITU-T G.722 at 56 or 64 kbit/s can be considered to be a "core coder".

This coder comprises a core bitrate coding stage 603 with quantization (block 601) on B+k−1 bits, of type for example ADPCM coding such as the standardized G.722 or G.727 coder or PCM (for "Pulse Code Modulation") such as the standardized G.711 coder.

This core coding stage comprises a local decoding module (block 602).

Figure 4:
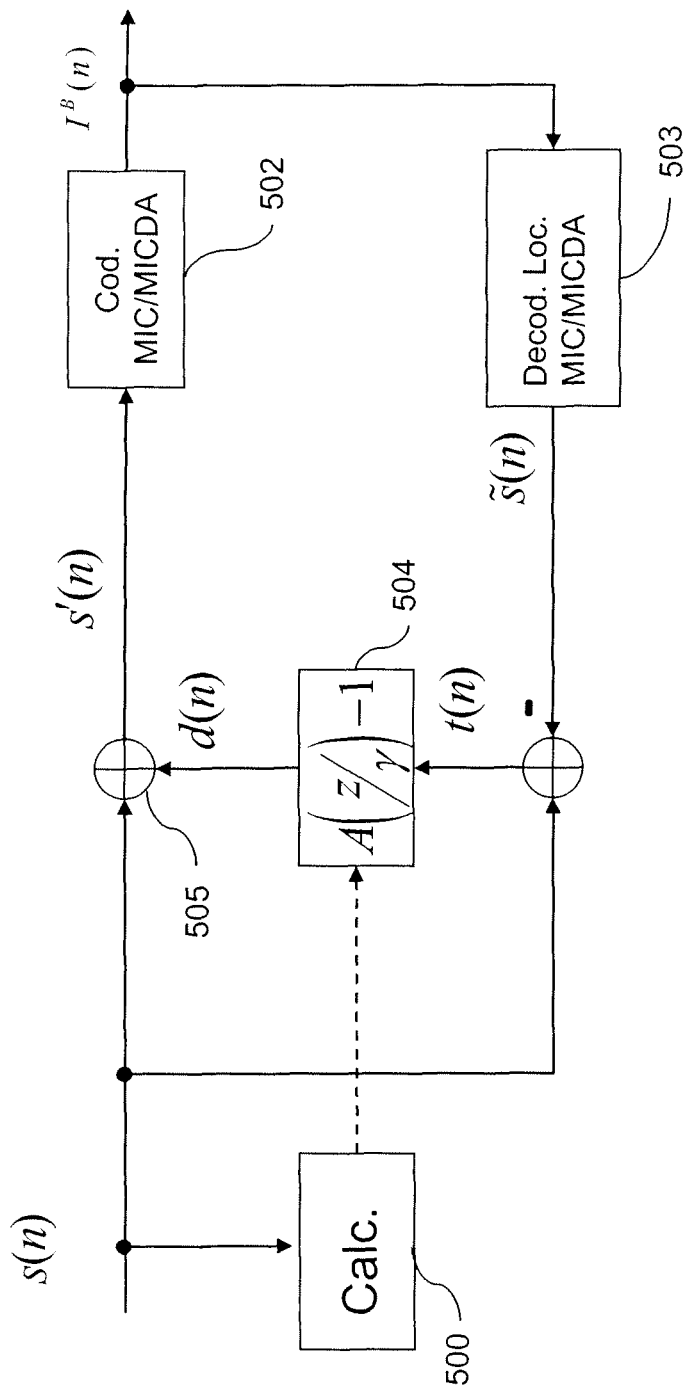
FIG. 4 illustrates an exemplary noise shaping in the case of a PCM/ADPCM coder according to the state of the art and such as described above.

The core bitrate coder comprises a noise shaping feedback loop similar to that described with reference to FIG. 4. Thus the coding noise is calculated (block 606), filtered (block 604) and reinjected (block 605).

The coder also comprises an improvement stage 613 affording one bit per sample so as to pass from the bitrate B+k−1 bits per sample to B+k bits per sample.

This improvement stage is optional for the implementation of an embodiment of the invention since the core coding stage alone can implement the method of noise shaping control as subsequently described.

This improvement stage uses a quantizer (610) and a local decoder (block 611) and carries out a shaping of the noise which uses the same masking filter $A(z/\gamma)-1$ as the core coder.

Thus the core coder and the improvement stage rely on the same noise shaping filter $(A(z/\gamma)-1)$ (blocks 604, 608) whose coefficients are calculated by the block 600.

Figure 6:
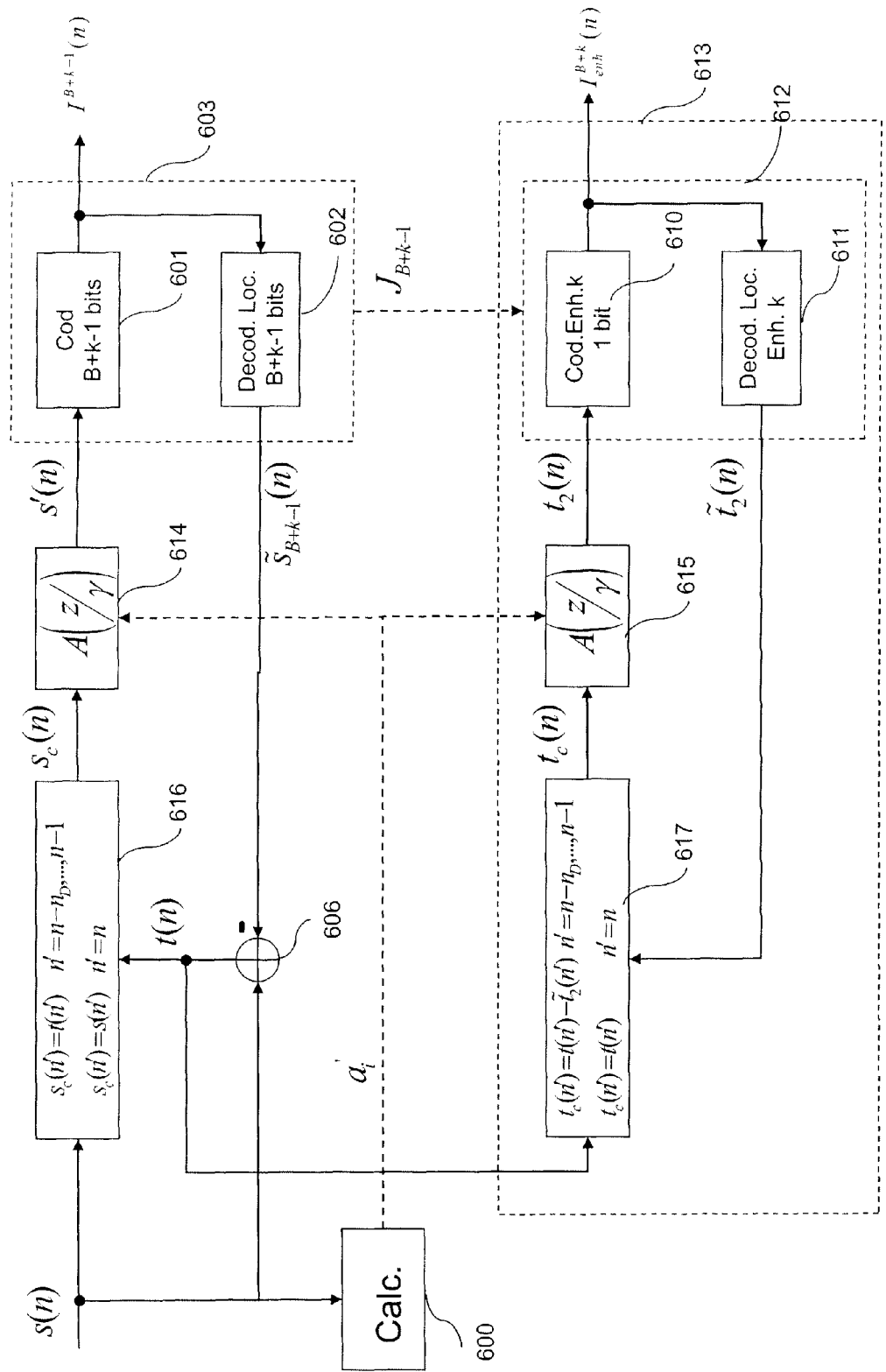
FIG. 6 illustrates a variant embodiment of a coder comprising a noise shaping control module according to an embodiment of the invention.

FIG. 6 gives a solution equivalent to that of FIG. 5 but gives another interpretation for the filtering part. Instead of using predictors $A(z/\gamma)-1$ it uses filters $A(z/\gamma)$ (modules 614 and 615) whose input (respectively $s_c(n)$ and $t_c(n)$) are prepared by the blocks 616 and 617 respectively, in the following manner:

$$s_c(n')=t(n') \; n'=n-n_D, \ldots, n-1$$

$$s_c(n')=s(n') \; n'=n$$

and $$t_c(n')=t(n')-\tilde{t}_2(n') \; n'=n-n_D, \ldots, n-1$$

$$t_c(n')=t(n') \; n'=n$$

The block 600 represents the noise shaping control module according to an embodiment of the invention.

Figure 1:
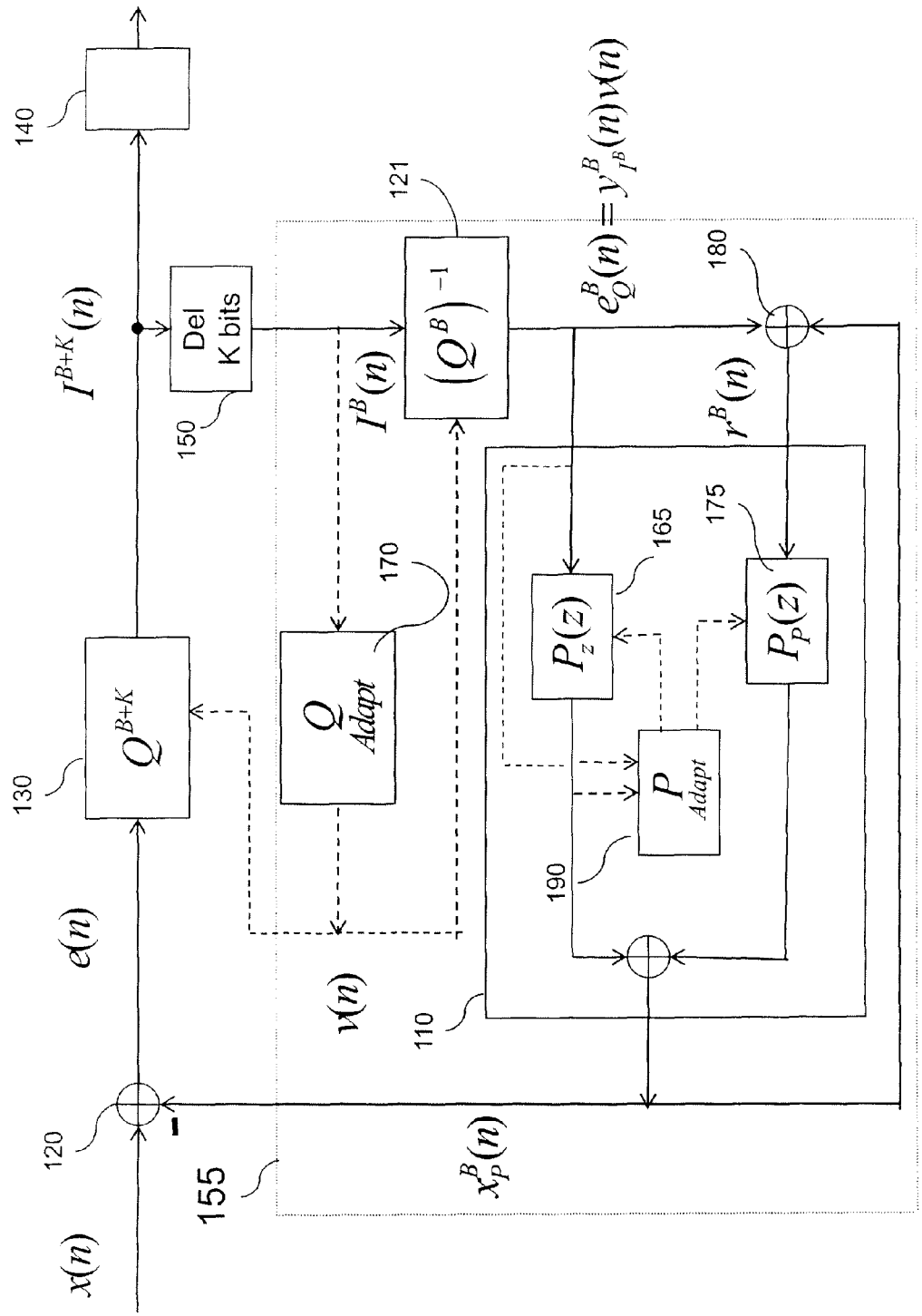
FIG. 1 illustrates an embedded-codes ADPCM-type coder according to the state of the art and such as described above.
Figure 2:
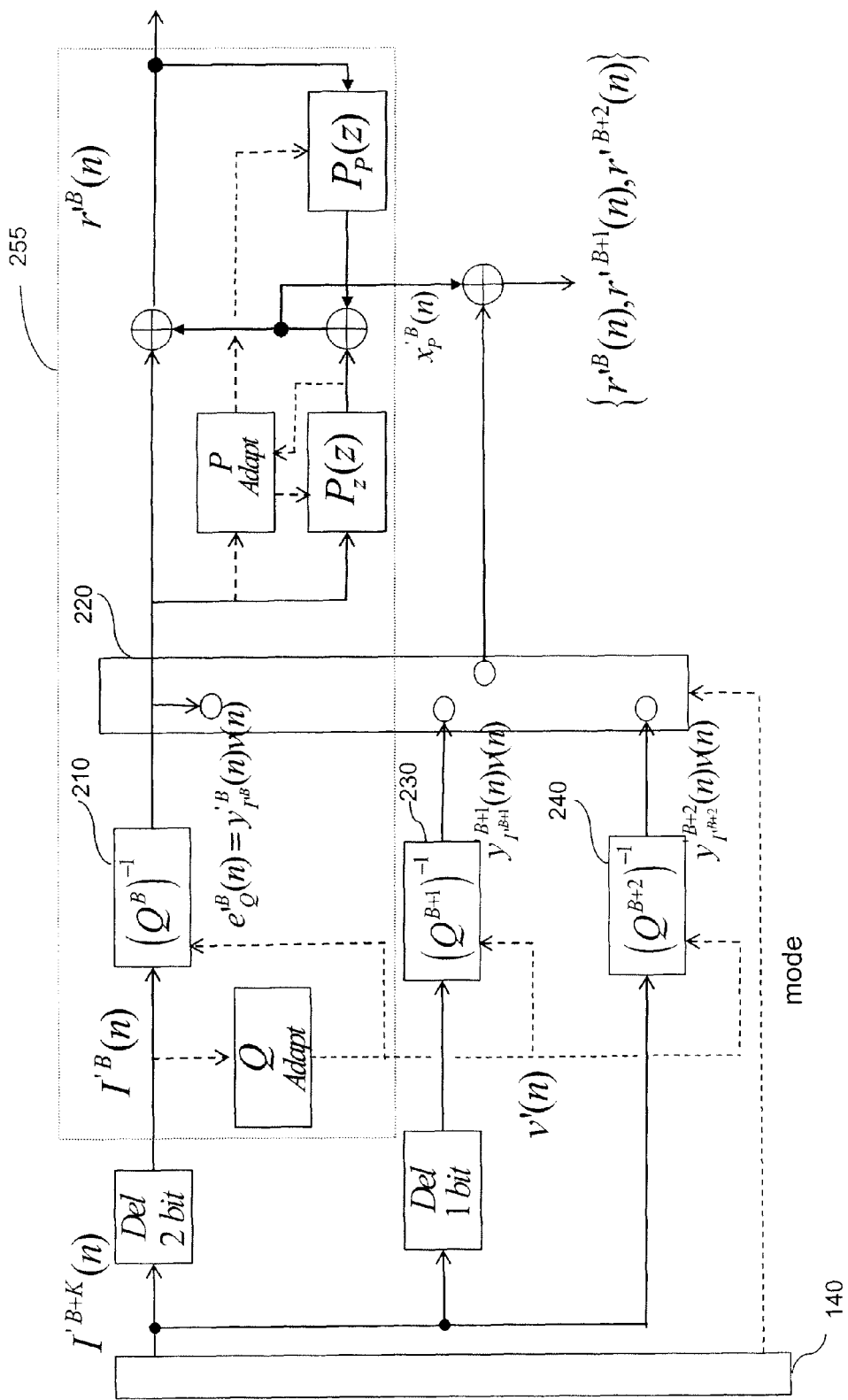
FIG. 2 illustrates an embedded-codes ADPCM-type decoder according to the state of the art and such as described above.
Figure 3:
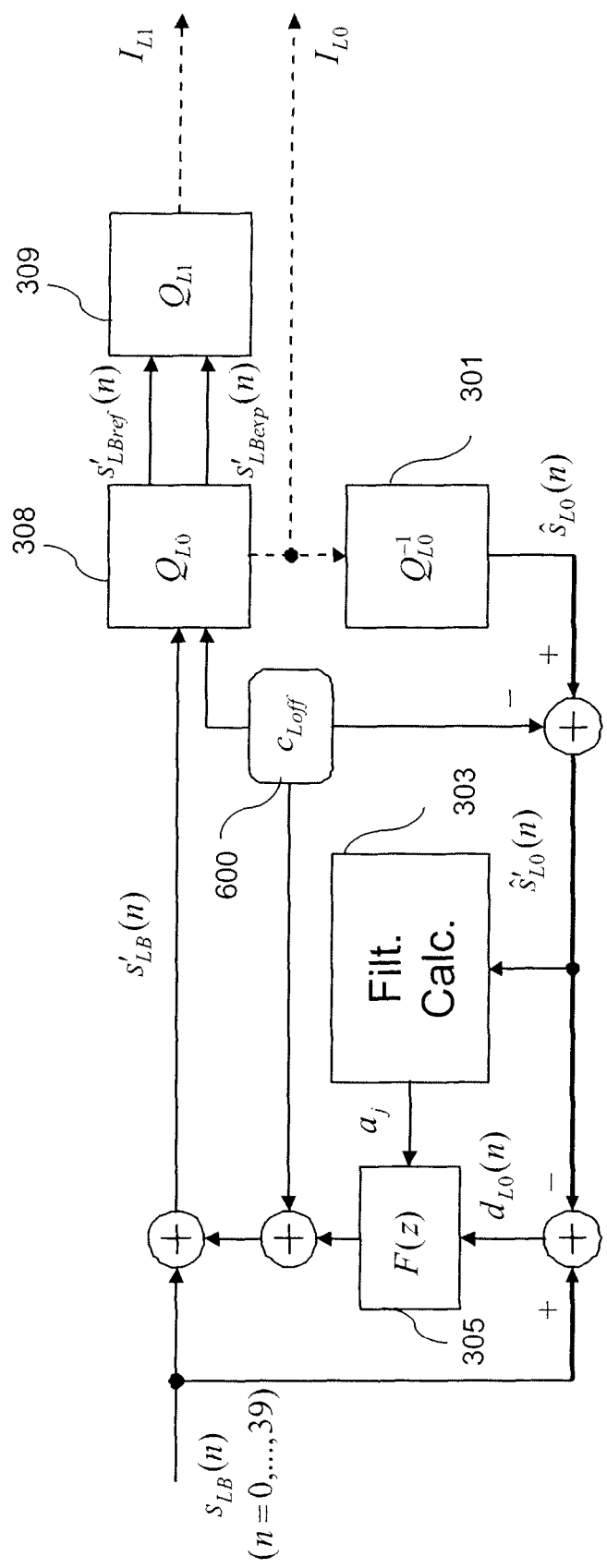
FIG. 3 illustrates the noise shaping applied in a coder of standardized G.711.1 type according to the state of the art and such as described above.

In this example, the control module 600 performs, inter alia, a calculation of the coefficients of the masking filter on the basis of the input signal s(n) as explained subsequently with reference to FIG. 7. This calculation of the coefficients of the masking filter can also be performed on the basis of the decoded signal as in the case of the G.711.1 coder described with reference to FIG. 3.

This module comprises especially means for obtaining a parameter indicating risk of instability of the feedback. Several examples of obtaining this parameter are explained subsequently.

This module furthermore comprises means for detecting a risk of instability of the feedback in the form for example of a comparator which will perform a comparison of the parameter obtained, with a predetermined threshold.

The module comprises means for limiting the feedback for example by setting a gain or a weighting factor to 0 or to a low value as explained subsequently.

It also comprises means of progressive reactivation of the feedback over a predetermined number of frames following the current frame for which the feedback has been limited. These means of progressive reactivation are for example means for ascribing values of weighting or of gain increasing progressively in tandem with the predetermined number of frames.

Figure 7:
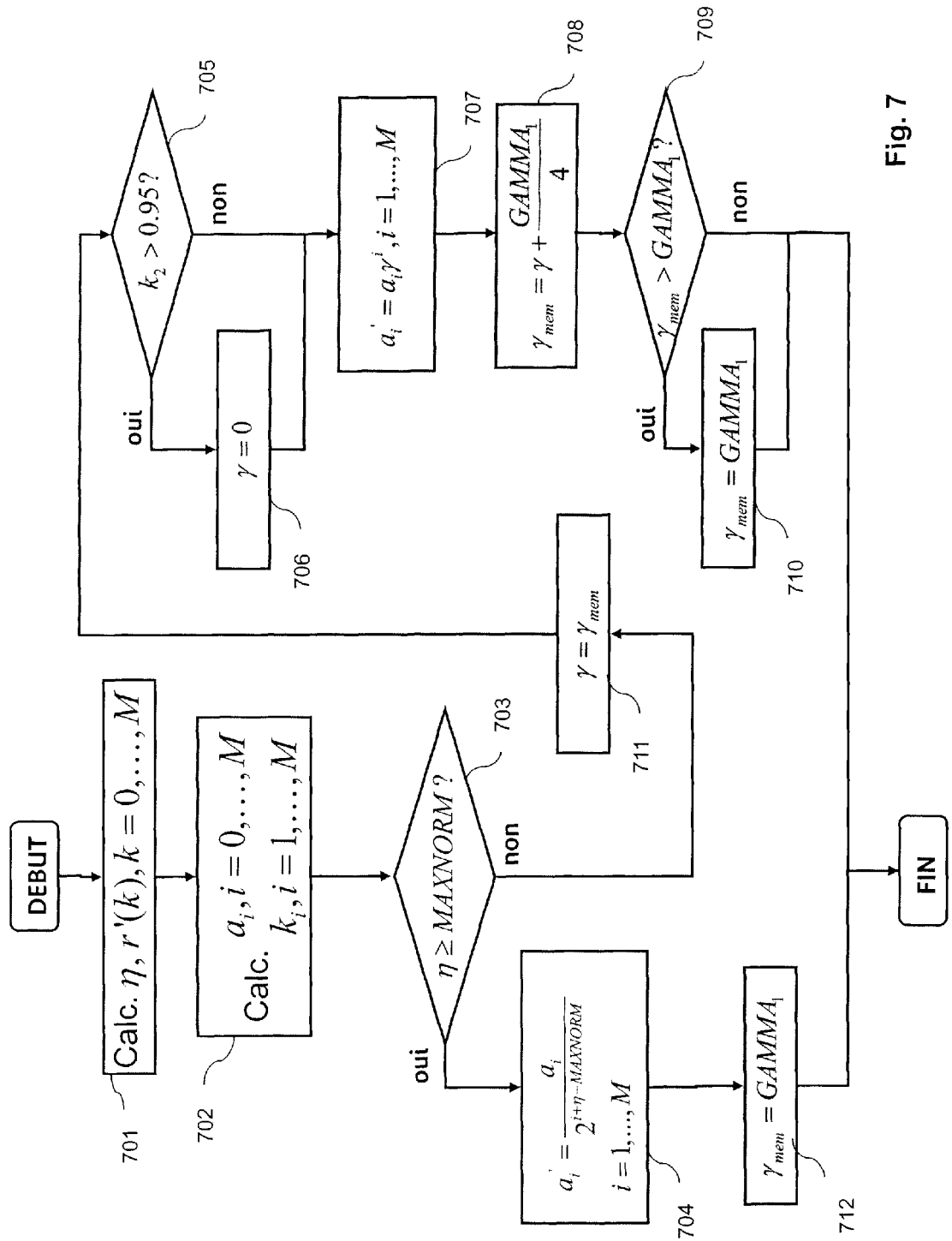
FIG. 7 illustrates a flowchart representing the steps of an embodiment of the noise shaping control method according to an embodiment of the invention.

This control module implements the noise shaping control method represented in flowchart form, in an embodiment described now with reference to FIG. 7.

In this embodiment, steps 701 to 704 are optional and do not necessarily form part of the control method according to an embodiment of the invention.

Here, M is defined as being the linear prediction order, used for the noise shaping, whose typical value is M=4.

Thus, in step 701, a calculation of autocorrelations, r(k), k=0, . . . , M, of the signal s(n), where M is the linear prediction order, is performed. Note that these autocorrelations could also be calculated on the basis of the decoded signal $\tilde{s}(n)$ as in G.711.1, without changing the nature of the method.

Accordingly, the signal s(n) is firstly preaccentuated by a filter of type $(1-\beta_e z^{-1})$ to obtain:

$$s^{pre}(n)=s(n)-\beta_e s(n-1)$$

where the factor $\beta_e$ is calculated as in G.711.1 according to the following formula:

$$\beta_e=1-0.007813 c_{zc1}$$

where $c_{zc1}$ is the number of zero crossings.

Thereafter a linear prediction filter (LPC) of order M=4 is estimated, once per frame (every 5 ms). Accordingly, the preaccentuated signal $s^{pre}(n)$ is weighted by an asymmetric and hybrid cosine-Hamming window of 80 samples (10 ms) centered on the start of the current frame to obtain $s_w^{pre}(n)$. The autocorrelation is thereafter calculated according to the formula:

$$r(k) = \sum_{n=k}^{79} s_w^{pre}(n)s_w^{pre}(n-k), k = 0, \ldots, M$$

The correlations thus obtained are modified in r'(k) with a band extension of 120 Hz including a correction factor of 1/1.0001—which represents a noise floor of 40 dB—as in G.711.1:

$$r'(k) = \begin{cases} r(k) & k=0 \\ w_{lag}(k)r_{L0}(k) & k=1, \ldots, M \end{cases}$$

where $$w_{lag}(k) = \frac{1}{1.0001}\exp\left[-\frac{1}{2}\left(\frac{2\pi f_0 k}{f_s}\right)^2\right]$$

with $f_0 = 120$ Hz and $f_s = 8000$ Hz.

In step 701, a normalization factor is also calculated, which counts the number of binary shift in fixed-point arithmetical representation as in G.711.1 defined by:

$$\eta=30-\lfloor\log_2(r(0))\rfloor$$

where $\lfloor . \rfloor$ represents a rounding down to the nearest integer.

Step 702 corresponds to the Levinson-Durbin algorithm described in ITU-T recommendation G.711.1 which provides as result:

the prediction coefficients $a_i$, i=0 . . . M the reflection coefficients $k_i$, i=1, . . . , M, associated with a trellis implementation of the linear prediction filter.

The Levinson-Durbin algorithm is a recursive algorithm whose steps are recalled hereinbelow:
Iteration number i=1, $a_0^{[0]}=1.0$, and $E^{[0]}=r'_{L0}(0)$
Calculate $$k_i = -\frac{1}{E^{[i-1]}}\left(r'_{L0}(i) + \sum_{j=1}^{i-1} a_k^{[i-1]} r'_{L0}(i-j)\right)$$

Fix $a_i^{[i]}=k_i$
Calculate $a_j^{[i]}=a_j^{[i-1]}+k_i a_{i-j}^{[i-1]}$ for j=i, . . . , i-1
Calculate $E^{[i]}=(1-k_i^2)E^{[i-1]}$
Increment i by 1 and go to step 2 until i=M.
The result is given by $a_j=a_j^{[M]}$, j=1, . . . , M which are the coefficients of the linear predictor $$A(z)=1+a_1 z^{-1}+a_2 z^{-2}+a_3 z^{-3}+a_4 z^{-4}$$

and by the reflection coefficients $k_i$ which correspond to a trellis implementation of the filter A(z) as explained in the reference by J. D. Markel and A. H. Gray "Linear Prediction of Speech", Springer-verlag, 1976.

The reflection coefficient $k_1$ represents the "slope" of the short-term spectrum of the signal modeled by linear prediction, while the reflection coefficient $k_2$ is an indicator of the spectral dynamic range of the signal since it is associated with the quality factor (degree of resonance) of the linear predictor of order 2 found at the second iteration of the Levinson-Durbin algorithm.

In the example illustrated here, this reflection coefficient $k_2$ constitutes a parameter indicating risk of instability of the feedback as illustrated with reference to FIG. 7.

It is shown here that the coefficient $k_2$ allows the detection of the signals with very large overvoltage, sinusoids in particular.

As explained previously, the signals with large overvoltage, sinusoids in particular, are at-risk signals (in respect of noise feedback) that ought to be detected. The detection of these at-risk signals maybe performed by examining the second partial correlation coefficient at the output of the Levinson-Durbin algorithm which is used to calculate the filter A(z) on the basis of which the weighting filter W(z)=A(z/γ) is calculated.

We shall calculate the second partial correlation coefficient by the Levinson-Durbin algorithm for a sinusoid s(n)=cos(nωT) of angular frequency $$\omega = \frac{2\pi f}{T}$$

at the sampling frequency 1/T which possesses an overvoltage at the level of its frequency. Its correlation function will be equal to:

$$r'_{L0}(k)=\cos(k\omega T).$$

The first step of the algorithm gives:

$$k_1 = -\cos(\omega T)$$
$$a_1^1 = -\cos(\omega T)$$
$$E^1 = \frac{1}{2}[1 - \cos(2\omega T)]$$

And the second step:

$$k_2=1$$
$$a_1^2=-2\cos(\omega T)$$
$$a_2^2=1$$
$$E^1=0$$

As the prediction error is zero, it is deduced that a sinusoid is predictable on the basis of 2 samples:

$$x(n)=2\cos(\omega T)x(n-1)-x(n-2)$$

On account of the diverse dampings of the correlation function before the calculation of the predictor, the overvoltage coefficient is not equal to its ideal value. For a sinusoid at 3000 Hz, $k_2=0.97$ is typically found. The solution implemented therefore consists in detecting the signals with large overvoltage which provide a partial correlation coefficient $k_2$ greater than a threshold typically 0.95.

Step 703 verifies whether the normalization factor η exceeds a limit value (MAXNORM=16), thereby making it possible to detect signals of low levels (silence or very low signal) as in G.711.1. In the case where this normalization factor exceeds a predetermined threshold, η≥MAXNORM, the linear prediction coefficients $a_i$, i=0, . . . , M are attenuated (step 704), this amounting to reducing the effect of the noise masking (or shaping) filter.

In this case, the mask filter W(z)−1 is obtained by using the coefficients $a_i$, i=0, . . . , M obtained in step 704 according to the following equation:

$$W(z) - 1 = \sum_{i=1}^{4} a'_i z^{-i} = \sum_{i=1}^{4} \frac{a_i}{2^{i+\eta-MAXNORM}} z^{-i}$$

In the converse case, the noise shaping filter is defined according to the formula:

$$W(z) - 1 = \sum_{i=1}^{4} a'_i z^{-i} = \sum_{i=1}^{4} a_i \gamma^i z^{-i}$$

It is assumed that the value of the attenuation factor γ is retained in memory and retrieved at the start of the processing of each frame. This value retained in memory is denoted $\gamma_{mem}$. This retrieval operation is performed in step 711.

In the frames where a signal of low level is detected (η≥MAXNORM), the parameter $\gamma_{mem}$ is reinitialized to a value equal for example to GAMMA$_1$=0.92 in step 712.

The noise shaping control method comprises a step 705 of detecting a risk of instability by comparing the indicating parameter with at least one predetermined threshold.

Several techniques exist for detecting signals with large spectral dynamic range such as sinusoids. In the case where a linear prediction analysis with reflection coefficients $k_2$ is deployed, as described here, it is advantageous to reuse the second reflection coefficient as described above.

In this exemplary implementation, step 705 consists in verifying whether the second reflection coefficient exceeds a predetermined value, here 0.95 ($k_2>0.95$). This test makes it possible to detect the signals with large spectral dynamic range and makes it possible to detect, in particular, pure sinusoids (without strong amplitude modulation, but of relatively constant amplitude).

If the test turns out to be positive, a step of limiting the feedback is performed since the risk of instability of this feedback is substantiated.

A possible limitation is for example the deactivation of the feedback, in step 706, by fixing the coefficient γ at 0.

In a variant the coefficient γ is fixed at a very low but nonzero value, for example 0.001. This variant corresponds not to complete deactivation of the feedback, but to limitation of the feedback, this producing the same effect (avoiding instability or saturation).

In an equivalent manner it would be possible in the frames where γ=0 to fix s'(n)=s(n) in FIGS. 5 and 6, this amounting to not injecting any noise on the signal s(n).

The linear prediction coefficients $a_i$, i=0, ..., M are weighted by γ in step 707 so as to calculate the coefficients of A(z/γ)−1.

The value $\gamma_{mem}$ retained in memory is thereafter updated for the next frame in step 708. This value is firstly calculated by incrementing γ by $$\frac{GAMMA_1}{4}$$

where $GAMMA_1$=0.92 for example and the result is saturated at $GAMMA_1$ in steps 709 and 710. Division by 4 makes it possible to retrieve after 4 frames a value of $GAMMA_1$.

In the case where γ is fixed at a very low value ($GAMMA_0$=0.001) at 706, it is possible to increment γ by values of $$\frac{GAMMA_1 - GAMMA_0}{4}.$$

This typical case is described for a predetermined number of frames equal to 4 but this step can quite obviously be performed on a greater or lesser number of frame than 4. Likewise, the incrementation values may be different and the incrementation may be performed with intervals distributed in a non-linear manner.

These steps 708 to 710 amount to performing a progressive reactivation of the feedback over a predetermined number of frames following (here 4 frames) the current frame for which the feedback has been limited.

Thus the noise shaping control method according to an embodiment of the invention consists in detecting the problematic signals liable to cause instability or saturation of the signal by a test performed in this embodiment, on the second reflection coefficient and to limit the noise feedback as soon as this test is positive. After a positive detection, the value of γ is progressively increased (after 4 frames in the example described here) up to its "normal" value $GAMMA_1$. The current value of γ is copied into $\gamma_{mem}$ so as to pass the value of this parameter from one frame to the next.

The successive incrementation of γ spread over several frames makes it possible to restore the noise feedback progressively, and prevents the looped system from diverging subsequent to overly abrupt reactivation of the feedback which may give rise to abrupt variations of the "local" statistics of the signal.

In a variant embodiment of the noise shaping control method, the parameter for indicating a risk of instability is different.

For example, a spectral flatness measurement is performed by calculating the ratio between the arithmetic mean and the geometric mean of the spectral lines of the power spectrum calculated on the basis of the short-term signal windowed by the LPC window. This measurement tends to a very large value for spectra containing only one line (pure sinusoid).

In this variant embodiment, the detection threshold making it possible to detect a signal of large dynamic range in step 705, depends on the context (frame length, window, etc). However, this variant involves calculating a short-term time-frequency transformation (of Fourier type) and calculating the measurement described hereinabove.

In another variant embodiment, no effort is made to detect a priori the signals with large dynamic range but rather to detect in a nonparametric and a posteriori manner problematic signals which give rise to instabilities in the feedback. In this embodiment, the instability risk parameter is the instantaneous signal-to-noise ratio between the input signal s(n) and the coding noise t(n) which are defined in FIGS. 5 and 6. The detection of problematic signals in step 705, is then done by fixing a threshold on the signal-to-noise ratio, for example as soon as this ratio is below 5 dB. In this embodiment, it is necessary to calculate a mean of the input signal and of the noise so as to be able to calculate signal-to-noise ratios which are well defined.

This type of a posteriori detection occurs, however, often when the problems of instability or of saturation are already in part observable. Moreover this variant exhibits the drawback of having a fairly high false alarm rate.

Figure 8:
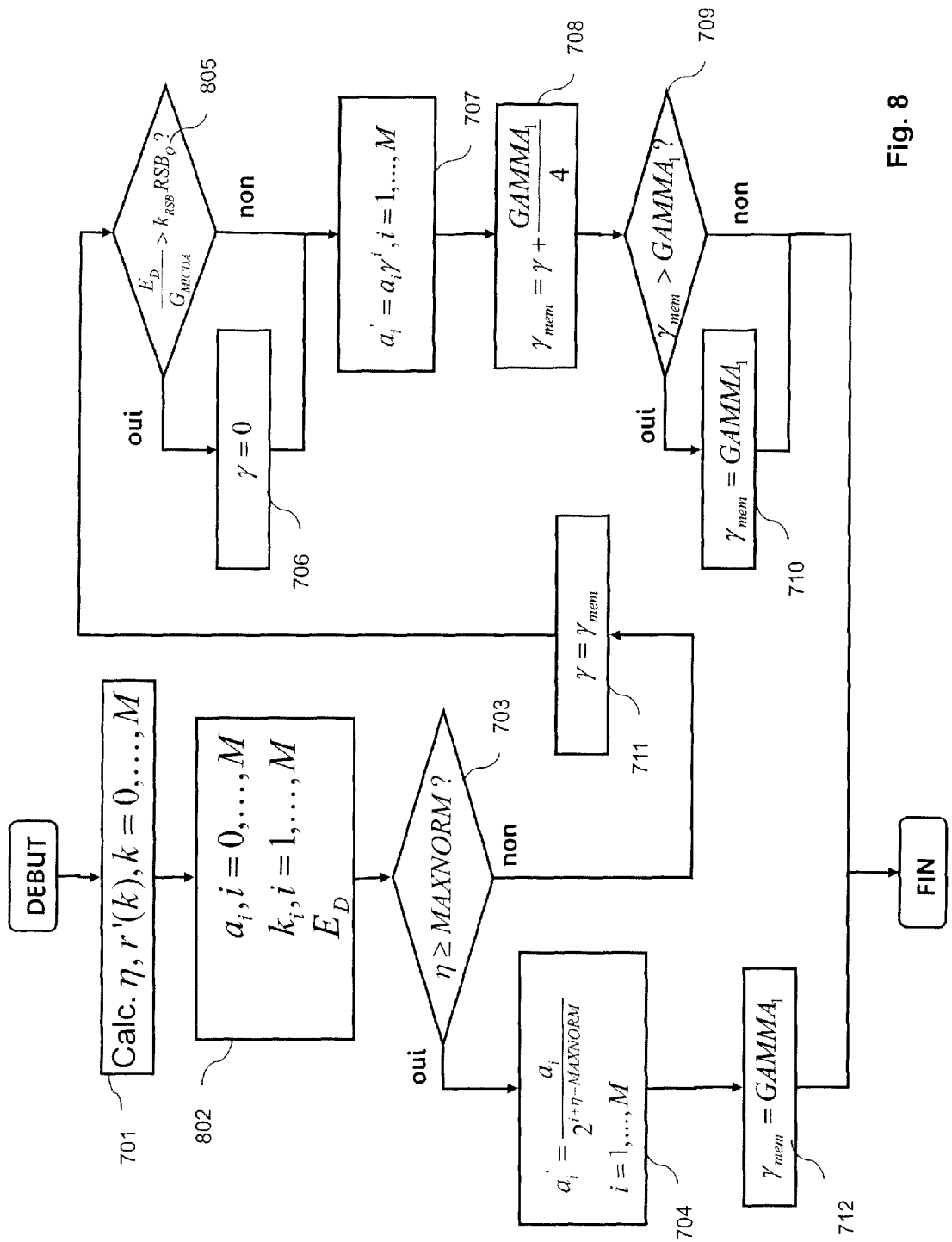
FIG. 8 illustrates a flowchart representing the steps of a variant embodiment of the noise shaping control method according to an embodiment of the invention.

Another embodiment for obtaining the parameter indicating risk of instability of the feedback and the detection of a risk of instability is illustrated in FIG. 8.

This algorithm differs from that described with reference to FIG. 7 only by steps 702 having become 802 and 705 having become 805.

Indeed, in step 802, not only are the coefficients of the linear predictor $a_i$, i=0 ... M and the reflection coefficients $k_i$, i=1, ..., M, obtained as described with reference to FIG. 7, but also the energy of the masking filter $E_D$ of the current frame is obtained in the following manner:

$$E_D = \sum_{n=0}^{\infty} f_D(n)^2$$

which may be approximated by the prediction gain at the output of the Levinson-Durbin algorithm. $E^{[M]}$ divided by $r'_{L0}(0)$.

In fact the masking filter is equal to $$H(z) = \frac{1}{1 + \sum_{i=1}^{M} a_i \gamma^i z^{-i}}$$

and to calculate its energy it is appropriate to use the algorithm which recalculates the successive predictors of lower order starting from $$A\left(\frac{z}{\gamma}\right)$$

as well as the partial correlation coefficients.

$$p_D^j(0) = 1,$$

$$p_D^m(j) = a_j \gamma^j$$

$$j = 1, \ldots, M$$

$$m = M, \ldots, 1$$

$$k_m = p_D^m(m)$$

$$p_D^{m-1}(j) = \frac{p_D^m(j) - k_m p_D^m(m-j)}{1 - k_m^2}$$

$$j = 1, \ldots, m-1$$

The resulting filter's energy $E_D$ calculated at 702 will be given by:

$$E_D = \prod_{j=1}^{M} 1 - k_j^2$$

The parameter indicating risk of instability is then given by $$\frac{E_D}{G_{ADPCM}}$$

With $G_{ADPCM}$ the prediction gain of the ADPCM coder estimated on the previous frame. It is approximated by the quotient of the saturation threshold $V(n)^2$ of the quantizer, possibly filtered, over the energy of the input signal $r'_{L0}(0)$.

The step of detecting a risk of instability 805 is then performed by comparing the indicating parameter $$\frac{E_D}{G_{ADPCM}}$$

with a threshold defined here as the signal-to-noise ratio of the ADPCM quantizer multiplied by a factor $k_{RSB}$ which adjusts the degree of risk ($k_{RSB}RSB_Q$).

$RSB_Q$ is in fact the signal-to-noise ratio of the ADPCM quantizer ($1/0.00414 \approx 241$ of the order of 24 dB for a 5-bit Laplace quantizer). The value of $RSB_Q$ for various numbers of bits and a Laplace probability density is given in table II of the article by Paez and Glisson "Minimum Mean-Squared-Error Quantization in Speech PCM and DPCM Systems" from the IEEE review Trans. Communications of April 1972 PP. 225-230.

The step of limiting the feedback of step 706 can also be performed in various ways.

In a different embodiment, the noise feedback is deactivated, not by setting the coefficient $\gamma$ to 0, but by applying a scale factor (or gain) g of zero value to the output of the filter $W(z)-1$.

This embodiment is illustrated with reference to FIG. 9.

This figure illustrates a hierarchical coder as represented in FIG. 5, with the same elements. The only difference originates from the control module for the noise shaping 900 which delivers at 913, as output of the filtering module 604 for the core coding and at 914 as output of the filtering module 608 for the improvement coding, a gain g which, when it is set to 0, deactivates the feedback.

This factor g is stored in $g_{mem}$ in the same manner as for the parameter $\gamma$ whose values are placed in memory in $\gamma_{mem}$ in step 711 of FIG. 7.

In the block 900, the calculation of the coefficients of the filter $W(z)-1$ is therefore similar to the block 600, except that in the case where $\eta < MAXNORM$, we fix $\gamma = GAMMA_1 = 0.92$. The block 900 provides, moreover, the value of the gain g applicable to the current frame as a function of $k_2$: if $k_2 > 0.95$, then g=0

Alternatively, the gain g is fixed at a very low but nonzero value, for example 0.001. This variant corresponds not to complete deactivation of the feedback, but to a limitation of the feedback.

The progressive restoral of the noise feedback is undertaken in this variant by progressively altering the value of g from 0 to 1. For example, in the frames which follow a detection $k_2 > 0.95$ and in which $k_2 \leq 0.95$ it will be possible to fix the value of g at 0.25, 0.5, 0.75 and 1 in the subsequent respective frames.

These values can quite obviously be adapted according to the limitation value given for g (e.g.: g=0.001 in the case of detection of risk of instability).

Moreover, in the frames where a signal of low level is detected at 703 ($\eta \geq MAXNORM$), the gain $g_{mem}$ is restored to a value 1 in a manner similar to step 712 of FIG. 7 which restores the value of $\gamma$.

Figure 10:
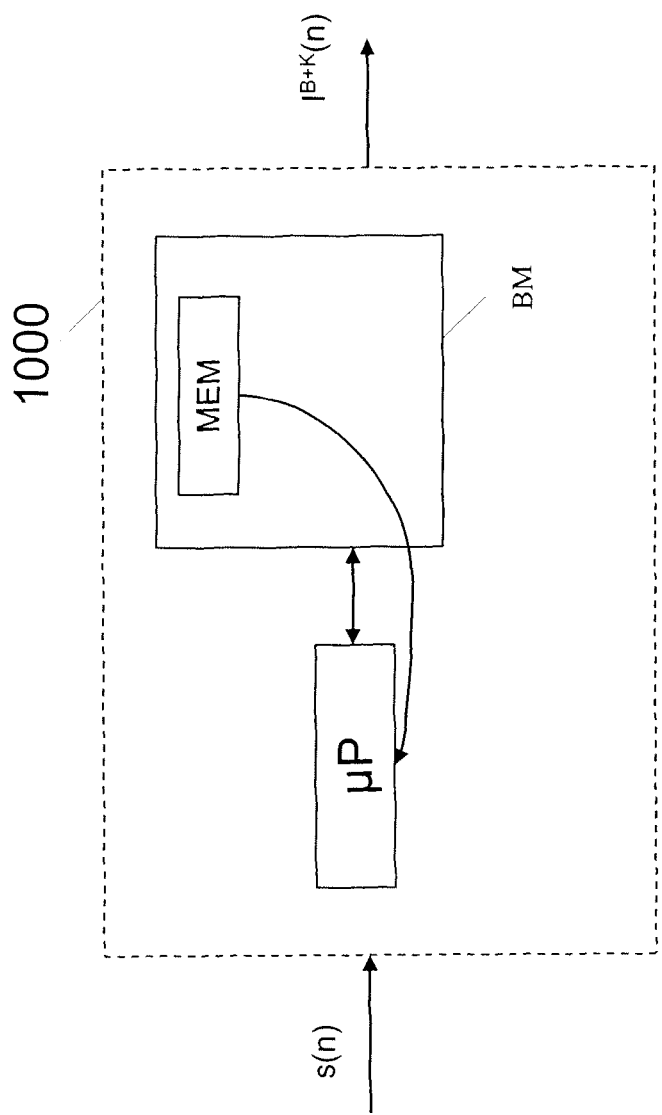
FIG. 10 represents a possible embodiment of a coder according to an embodiment of the invention.

An exemplary embodiment 1000 of a coder according to an embodiment of the invention is now described with reference to FIG. 10.

Figure 9:
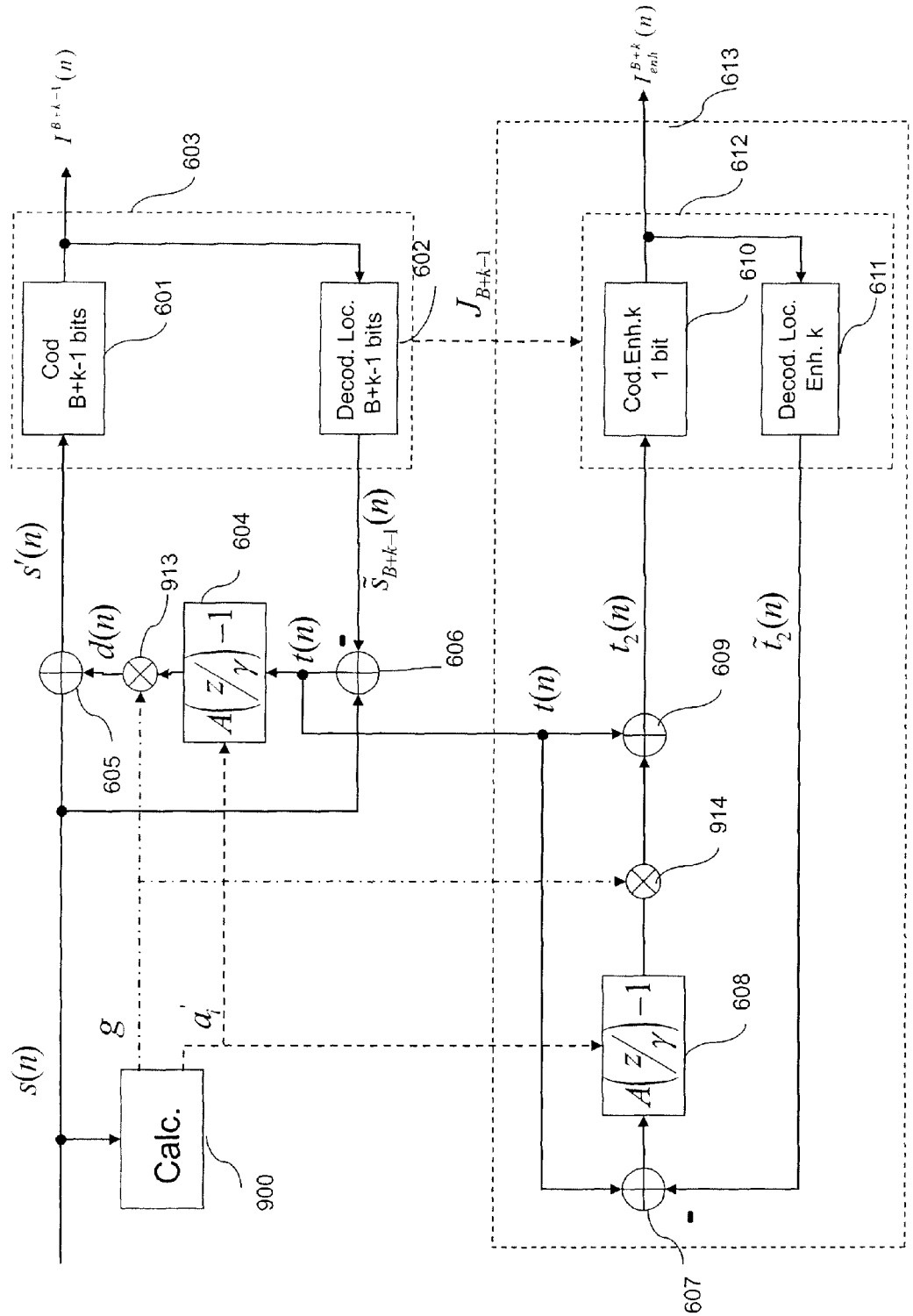
FIG. 9 illustrates a variant embodiment of the noise shaping control method and module according to an embodiment of the invention for a second exemplary coder of PCM/ADPCM type with an improvement layer.

With respect to hardware, a coder such as described according to the embodiments of FIGS. 5, 6 and 9 within the meaning of an embodiment of the invention typically comprises a processor μR cooperating with a memory block BM including a storage and/or work memory, as well as an aforementioned buffer memory MEM in the guise of means for storing for example the values of instability detection threshold or all other data necessary for the implementation of the noise shaping control method as described with reference to FIGS. 5, 6, 7, 8 and 9. This coder receives as input a digital signal s(n) and delivers multiplexed quantization indices $I^{B+K}$.

The memory block BM can comprise a computer program comprising the code instructions for the implementation of the steps of the method according to an embodiment of the invention when these instructions are executed by a processor μR of the coder and especially the steps of obtaining a parameter indicating risk of instability of the feedback, of detecting a risk of instability by comparing the indicating parameter with at least one predetermined threshold, of limiting the feedback in the case of detection of risk of instability and of progressive reactivation of the feedback over a predetermined number of frames following the current frame for which the feedback has been limited.

In a more general manner, a storage means, readable by a computer or a processor, optionally integrated into the coder, possibly removable, stores a computer program implementing a noise shaping control method according to an embodiment of the invention.

FIGS. 7 and 8 can for example illustrate the algorithm of such a computer program.

Although the present disclosure has been described with reference to one or more examples, workers skilled in the art will recognize that changes may be made in form and detail without departing from the scope of the disclosure and/or the appended claims.

The invention claimed is:

1. A method comprising:
receiving a digital audio input signal by a coder device;
performing an ADPCM-type coding of the digital audio input signal by the coder device to produce multiplexed quantization indices;
during the ADPCM-type coding of the digital audio input signal, controlling shaping of coding noise by implementing a feedback by the coder device comprising a filtering of the noise, wherein controlling shaping comprises the following acts:
obtaining a second reflection coefficient arising from a linear prediction analysis of the input signal, this parameter indicating a large spectral dynamic range of the signal and a risk of instability of the feedback;
detection of a risk of instability by comparing the second reflection coefficient with at least one predetermined threshold;
deactivation of the feedback by the coder device in the case of detection of risk of instability; and
progressive reactivation of the feedback by the coder device over several frames following a current frame for which the feedback has been deactivated; and
transmitting the quantization indices on a transmission channel.

2. The method as claimed in claim 1, wherein the deactivation of the feedback is performed by setting to zero a weighting coefficient to be applied to the noise filtering parameters.

3. The method as claimed in claim 1, wherein the deactivation of the feedback is performed by applying a gain of zero value at the output of the noise filtering.

4. The method as claimed in claim 2, wherein the progressive reactivation of the feedback is performed by applying a weighting coefficient to the filtering parameters, the weighting coefficient being defined by incrementation over the several frames.

5. The method as claimed in claim 3, wherein the progressive reactivation of the feedback is performed by applying an increasing gain value at the output of the noise filtering over the several frames.

6. The method as claimed in claim 1, wherein the method is implemented by the coder device both during core coding and during improvement coding of a hierarchical coding.

7. A digital audio signal ADPCM-type coder comprising:
a core coding stage configured to receive a digital audio input signal and perform an ADPCM-type coding of the digital audio input signal to produce multiplexed quantization indices;
a feedback for shaping a coding noise of the core coding stage containing a noise filtering module, and
a noise shaping control module including:
means for obtaining a second reflection coefficient arising from a linear prediction analysis of the input signal, this parameter indicating a large spectral dynamic range of the signal and a risk of instability of the feedback;
means for detecting a risk of instability by comparing the second reflection coefficient with at least one predetermined threshold;
means for deactivating the feedback in the case of detection of risk of instability; and
means of progressive reactivation of the feedback over several frames following the current frame for which the feedback has been deactivated;
wherein the core coding stage transmits the quantization indices on a transmission channel.

8. A non-transitory computer-readable memory comprising a computer program comprising code instructions for implementing a method, when these instructions are executed by a processor of a coder device, wherein the instructions comprise:
instructions that configure the coder device to receive a digital input signal;
instructions that configure the coder device to perform an ADPCM-type coding of the digital audio input signal to produce multiplexed quantization indices;
instructions that configure the coder device to control shaping of coding noise during the ADPCM-type coding of the digital audio input signal, the noise shaping being performed by implementation of a feedback comprising a filtering of the noise, these instructions comprising:
instructions that configure the coder device to obtain the second reflection coefficient arising from a linear prediction analysis of the input signal, this parameter indicating large spectral dynamic range of the signal and a risk of instability of the feedback;
instructions that configure the coder device to detect a risk of instability by comparing the second reflection coefficient with at least one predetermined threshold;
instructions that configure the coder device to deactivate the feedback in the case of detection of risk of instability; and
instructions that configure the coder device to progressively reactivate the feedback over several frames following a current frame for which the feedback has been deactivated; and
instructions that configure the coder device to transmit the quantization indices on a transmission channel.

* * * * *